June 3, 1952 A. E. LAMB 2,599,463
ATTACHMENT FOR EYEGLASSES
Filed Jan. 16, 1950
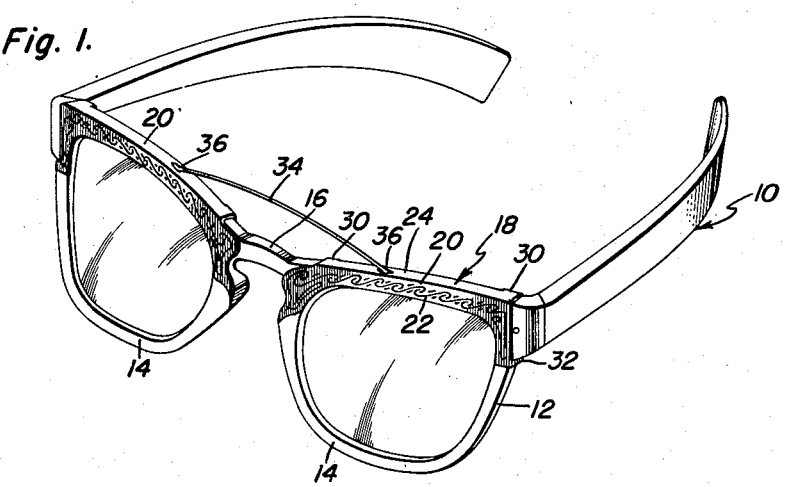
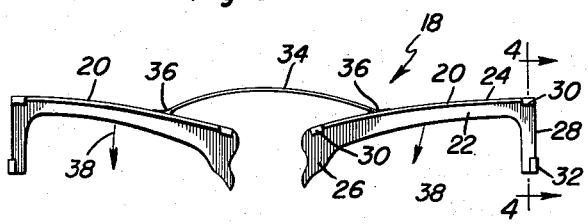
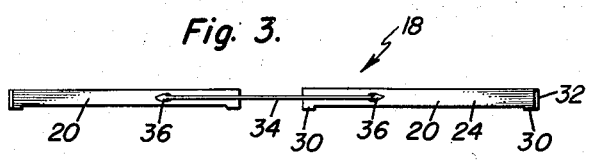
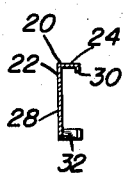
Ann E. Lamb
INVENTOR.
BY *Clarence A. O'Brien*
and *Harvey B. Jacobson*
Attorneys Patented June 3, 1952

2,599,463

UNITED STATES PATENT OFFICE 2,599,463

ATTACHMENT FOR EYEGLASSES

Ann E. Lamb, Wildwood, N. J.

Application January 16, 1950, Serial No. 138,910

1 Claim. (Cl. 41—34)

This invention relates to new and useful improvements and structural refinements in eyeglasses, and the principal object of the invention is to provide an ornamental, decorative attachment such as may be quickly and easily applied to the frame of eyeglasses for the purpose of enhancing the appearance thereof, but which may be expeditiously removed for substitution by another having different ornamentations, or for use on the frame of other eyeglasses, thus eliminating obvious disadvantages which are incident to the provision of permanent decorations on eyeglass frames.

Some of the advantages of the invention reside in the simplicity of construction, in its pleasing appearance and in its adaptability to economical manufacture.

One of the primary features of the invention lies in the provision of means for frictionally retaining the attachment in position on the eyeglass frame, thus safeguarding against possible loss.

With the above more important objects and features in view and such other objects and features as may become apparent as the specification proceeds, the invention consists essentially in the construction and arrangement of parts as shown in the accompanying drawings, in which:

Figure 1 is a perspective view of a pair of eyeglasses showing the invention applied thereto;

Figure 2 is a rear elevational view of the invention per se;

Figure 3 is a top plan view of the subject shown in Figure 2; and

Figure 4 is a sectional detail, taken substantially in the plane of the line 4—4 in Figure 2.

Like characters of reference are employed to designate like parts in the specification and throughout the several views.

Referring now to the accompanying drawings in detail, the general reference character 10 designates a pair of eyeglasses having a frame 12 which includes a pair of spaced lens receiving rims 14 connected together by a nose piece or bridge 16, the invention residing in the provision of an attachment designated generally by the reference character 18.

This attachment embodies in its construction a pair of elongated, ornamental members 20 which are shaped so as to conform substantially to the configuration of the upper portions of the respective rims 14, it being noted that each of the members 20 includes a front wall 22 provided at its upper edge with a rearwardly extending flange 24 which is adapted to rest on the upper edge of the associated rim while the front wall 22 is disposed against the front surface of the upper portion of the rim, as will be clearly apparent.

The elongated members 20 may be provided integrally with depending inner and outer portions 26, 28, respectively, and it is to be noted that the flange 24 of each member is provided at the rear edge thereof with a pair of longitudinally spaced, downturned keeper lugs 30 which are intended to engage the rear surface of the upper portion of the associated rim 14. Moreover, a rearwardly and inwardly extending keeper lug 32 is provided on the depending portion 28 of each of the members 20 so as to engage the side edge portion of the associated rim 14, as is clearly illustrated in Figure 1.

While the members 20 are located in proper position on the respective rims 14 by the several lugs 30, 32, they are actually retained in position thereon by a resilient element, namely an arcuate spring rod 34 which has its opposite end portions rigidly secured, as at 36, to intermediate portions of the flanges 24 of the two members 20, whereby the latter are not only connected together, but whereby they are urged in frictional engagement with the rims 14, as indicated by the arrows 38.

It is believed that the advantages and use of the invention will be clearly apparent from the foregoing disclosure and, accordingly, further description thereof at this point is deemed unnecessary.

Having described the invention, what is claimed as new is:

In combination with an eyeglass frame including a pair of spaced rims having top portions and inner and outer sides, an attachment for said rims comprising a pair of elongated ornamental solid separated members for said rims, respectively, each including a flat front wall and a right angled flange on said wall substantially coextensive therewith, said members fitting on said top portions with the front walls extending along said top portions in front of said rims, and said flanges extending over and along said top portions and resting thereon, said flanges having depending inner and outer end portions fitting flat against said inner and outer sides in front of said rims, attaching lugs on the ends of said flanges engaging said top portions in the rear of said rims, terminal attaching lugs on said depending portions engaging the outer sides of said rims in the rear thereof, and an upwardly arched resilient rod connecting said flanges together intermediate the ends of said members.

ANN E. LAMB.

REFERENCES CITED

The following references are of record in the file of this patent:

UNITED STATES PATENTS

| Number | Name | Date |
|---|---|---|
| 895,483 | Metcalf | Aug. 11, 1908 |
| 1,310,077 | Heaford | July 15, 1919 |
| 1,557,322 | Peck | Oct. 13, 1925 |
| 2,538,692 | Lindblom | Jan. 16, 1951 |
| 2,566,236 | Meddoff | Aug. 28, 1951 |

FOREIGN PATENTS

| Number | Country | Date |
|---|---|---|
| 366,740 | Great Britain | Feb. 11, 1932 |
| 466,034 | Great Britain | May 20, 1937 |